(12) United States Patent
Choi et al.

(10) Patent No.: US 11,799,072 B2
(45) Date of Patent: Oct. 24, 2023

(54) ANODE ACTIVE MATERIAL FOR SECONDARY BATTERY, ELECTRODE COMPRISING SAME, AND METHOD FOR MANUFACTURING SAME

(71) Applicant: LG CHEM, LTD., Seoul (KR)

(72) Inventors: Hee Won Choi, Daejeon (KR); Je Young Kim, Daejeon (KR); Sang Wook Woo, Daejeon (KR); Li Lin Piao, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 360 days.

(21) Appl. No.: 17/058,194

(22) PCT Filed: Jan. 3, 2020

(86) PCT No.: PCT/KR2020/000152
§ 371 (c)(1),
(2) Date: Nov. 24, 2020

(87) PCT Pub. No.: WO2020/141953
PCT Pub. Date: Jul. 9, 2020

(65) Prior Publication Data
US 2021/0184205 A1  Jun. 17, 2021

(30) Foreign Application Priority Data
Jan. 3, 2019 (KR) .................. 10-2019-0000664

(51) Int. Cl.
*H01M 4/36* (2006.01)
*H01M 4/587* (2010.01)
(Continued)

(52) U.S. Cl.
CPC .......... *H01M 4/364* (2013.01); *H01M 4/587* (2013.01); *H01M 10/0525* (2013.01); *H01M 2004/021* (2013.01); *H01M 2004/027* (2013.01)

(58) Field of Classification Search
CPC ... H01M 4/36–364; H01M 4/583–587; H01M 10/0525; H01M 2004/021; H01M 2004/027
See application file for complete search history.

(56) References Cited

U.S. PATENT DOCUMENTS

2013/0078497 A1    3/2013  Tani et al.
2016/0181612 A1*   6/2016  Lee ................. H01G 11/24
                                              252/182.1
(Continued)

FOREIGN PATENT DOCUMENTS

CN      1808745 A     7/2006
JP      3532016 B2    5/2004
(Continued)

OTHER PUBLICATIONS

Machine translation of KR-20010068269-A, as obtained from PE2E search. Translation obtained on Jan. 10, 2023. (Year: 2001).*
(Continued)

*Primary Examiner* — Milton I Cano
*Assistant Examiner* — Oscar Londono
(74) *Attorney, Agent, or Firm* — Birch, Stewart, Kolasch & Birch, LLP

(57) ABSTRACT

An anode active material for a secondary battery, which has improved cycle swelling properties and rapid charge performance, an anode comprising an anode active material for a secondary battery, and a method for manufacturing same. The anode active material is a mixture of scaly natural graphite and spherical natural graphite. An average particle
(Continued)

diameter ($D_{50}$) of the scaly natural graphite is 10 μm to 15 μm and an average particle diameter ($D_{50}$) of the spherical natural graphite is 14 μm or less.

11 Claims, 1 Drawing Sheet

(51) Int. Cl.
*H01M 10/0525* (2010.01)
*H01M 4/02* (2006.01)

(56) References Cited

U.S. PATENT DOCUMENTS

| | | | |
|---|---|---|---|
| 2017/0110729 A1 | 4/2017 | Tsuchiya et al. | |
| 2017/0133682 A1 | 5/2017 | Kang et al. | |
| 2018/0006300 A1 | 1/2018 | Jeong et al. | |
| 2019/0305308 A1 | 10/2019 | Lee et al. | |

FOREIGN PATENT DOCUMENTS

| | | | | |
|---|---|---|---|---|
| JP | 2005-71918 | A | | 3/2005 |
| JP | 2012-133981 | A | | 7/2012 |
| JP | 2013-8526 | A | | 1/2013 |
| JP | 2013-73718 | A | | 4/2013 |
| JP | 2013-200984 | A | | 10/2013 |
| JP | 2015-118819 | A | | 6/2015 |
| JP | WO2015/152113 | A1 | | 10/2015 |
| JP | 2016-72110 | A | | 5/2016 |
| JP | 5974573 | B2 | * | 8/2016 ........... Y02E 60/122 |
| JP | 2017-62991 | A | | 3/2017 |
| KR | 20010068269 | A | * | 1/2001 ........... H01M 4/386 |
| KR | 10-2011-0042840 | A | | 4/2011 |
| KR | 10-2014-0099988 | A | | 8/2014 |
| KR | 10-2014-0139355 | A | | 12/2014 |
| KR | 10-2016-0018174 | A | | 2/2016 |
| KR | 10-2016-0136320 | A | | 11/2016 |
| KR | 10-2017-0053123 | A | | 5/2017 |
| KR | 10-2018-0004426 | A | | 1/2018 |
| KR | 10-2018-0035693 | A | | 4/2018 |

OTHER PUBLICATIONS

Machine translation of JP-5974573-B2, as obtained from PE2E search. Translation obtained on Jan. 10, 2023. (Year: 2016).*
Machine translation of JP-2013008526-A, as obtained from PE2E search. Translation obtained on Jan. 10, 2023. (Year: 2013).*
Japanese Office Action for Japanese Application No. 2020-564193, dated Dec. 6, 2021, with English translation.
Extended European Search Report for European Application No. 20735950.6, dated Aug. 2, 2021.
International Search Report (PCT/ISA/210) issued in PCT/KR2020/000152 dated Apr. 14, 2020.
Korean Notification of Reason for Refusal for Korean Application No. 10-2019-0000664, dated Aug. 25, 2021, with an English translation.

* cited by examiner

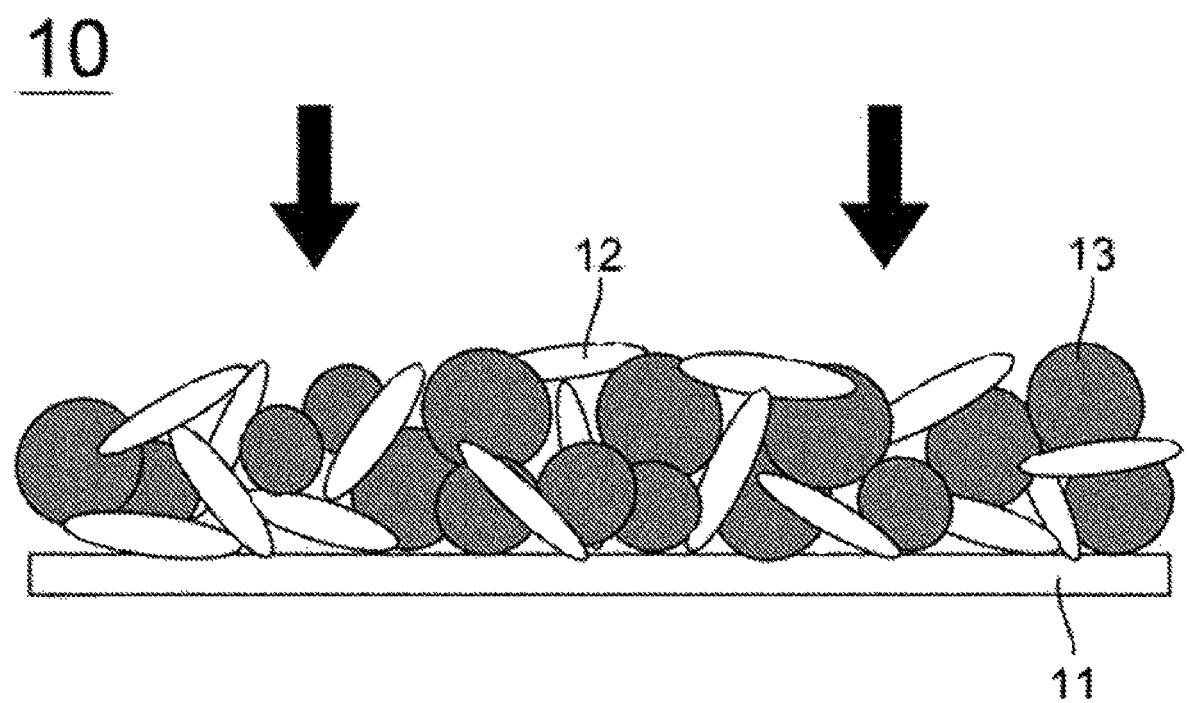

ANODE ACTIVE MATERIAL FOR SECONDARY BATTERY, ELECTRODE COMPRISING SAME, AND METHOD FOR MANUFACTURING SAME

TECHNICAL FIELD

This application claims the benefit of priority based on Korean Patent Application No. 10-2019-0000664, filed on Jan. 3, 2019, and the entire contents of the Korean patent application are incorporated herein by reference.

The present invention relates to a negative electrode active material for a secondary battery, a negative electrode including the same and a method for manufacturing the same. More specifically, the present invention relates to a negative electrode active material having improved cycle swelling and high rate charging properties, a negative electrode, and a method for manufacturing the same.

BACKGROUND ART

As the price of energy sources increases due to depletion of fossil fuels and the interest in environmental pollution increases, the demand for environmentally friendly alternative energy sources becomes an indispensable factor for future life. Especially, as technology development and demand for mobile devices are increasing, demand for secondary batteries as energy sources is rapidly increasing.

Typically, in terms of the shape of the battery, there is a high demand for a prismatic secondary battery and a pouch-type secondary battery that can be applied to products such as mobile phones with a small thickness. In terms of materials, there is a high demand for lithium secondary batteries such as lithium ion batteries and lithium ion polymer batteries having high energy density, discharge voltage, and output stability.

Generally, in order to prepare a secondary battery, first, a positive electrode and a negative electrode are formed by applying an electrode mixture containing an electrode active material to a surface of a current collector, then a separate is interposed therebetween to thereby make an electrode assembly, which is then mounted in a cylindrical or rectangular metal can or inside a pouch-type case of an aluminum laminate sheet, and a liquid electrolyte is injected or impregnated into the electrode assembly or a solid electrolyte to prepare a secondary battery.

Further, secondary batteries are classified according to the structure of the electrode assembly having a positive electrode/separator/negative electrode structure. Representative examples thereof include a jelly-roll (wound) electrode assembly in which long sheet type positive electrodes and negative electrodes are wound with a separator interposed therebetween, a stacked electrode assembly in which a plurality of positive and negative electrodes cut in a predetermined size unit are sequentially stacked with a separator interposed therebetween, and a stacked/foldable electrode assembly in which bi-cells or full cells, in which positive and negative electrodes of a predetermined unit are stacked with a separator interposed therebetween, are wound with a separator sheet.

On the other hand, the electrode generates a current through the exchange of ions, and the positive electrode and negative electrode constituting the electrode has a structure in which the electrode active material is applied to the electrode current collector made of metal.

Among them, in the case of the negative electrode, in the related art, lithium metal was used as a negative electrode in the secondary battery. However, as the short circuit of the battery due to the formation of dendrites and the risk of explosion caused by this are known, lithium metal is being replaced with a carbon-based compound capable of reversible intercalation and desorption of lithium ions while maintaining structural and electrical properties.

The carbon-based compound has a very low discharge potential of about −3 V to the standard hydrogen electrode potential and exhibits excellent electrode life due to very reversible charge/discharge behavior due to the uniaxial orientation of the graphite layer. In addition, since the electrode potential during Li-ion charging is 0V Li/Li+ and can exhibit a potential almost similar to that of pure lithium metal, it has an advantage that higher energy can be obtained when constructing an oxide positive electrode and a battery.

The carbon-based compound includes crystalline carbon and amorphous carbon. Representative examples of crystalline carbon include graphite carbon such as natural graphite and artificial graphite, and examples of amorphous carbon include non-graphitizable carbons (hard carbons) obtained by carbonizing polymer resins, graphitizable carbons (soft carbons) obtained by heat treatment of pitch, etc.

In particular, as a carbon-based material, natural graphite with high capacity or excellent artificial graphite having high temperature characteristics is used. However, artificial graphite has a lower capacity than natural graphite, has a poor processability such as a decrease in the production of negative electrode slurry and the decrease in electrode adhesion due to secondary granulation and coating treatment, and has low electrode rolling properties.

Korean Patent Publication No. 2014-0132791 discloses a negative electrode material using spheroidized natural graphite. However, in the case of a negative electrode active material using natural graphite, the mechanical strength of the electrode is weak, and the cycle swelling and rapid charging performance during charging and discharging are poor. In this case, during charging and discharging, the electrode may swell, resulting in problems such as reduced cycle life.

Therefore, there is a need for technology development for solving the problem.

DISCLOSURE

Technical Problem

The present invention was created to solve the above problems, and in the negative electrode active material using natural graphite, by using a mixture of natural graphite, which is generated by granulating scaly natural graphite and making it into secondary particles, and spheroidized natural graphite with a high degree of spheroidization and tap density, a negative electrode active material with improved cycle characteristics, swelling characteristics and rapid charging performance at the level of artificial graphite even when natural graphite is used, a negative electrode containing the same, and a method for manufacturing the same are provided in the present invention, which is an object of the present invention.

Technical Solution

A negative electrode active material for a secondary battery according to the present invention
    may be a mixture of scaly natural graphite and spheroidized natural graphite, and the scaly natural graphite may have an average particle diameter ($D_{50}$) of 10 to 15 μm, and the spheroidized natural graphite may have an average particle diameter ($D_{50}$) of 14 μm or less.

In addition, in the negative electrode active material for a secondary battery according to the present invention, the scaly natural graphite may have been granulated and agglomerated into secondary particles.

In addition, in the negative electrode active material for a secondary battery according to the present invention, the negative electrode active material may include 40 to 60% by weight of the scaly natural graphite and 40 to 60% by weight of the spheroidized natural graphite based on the total weight of the negative electrode active material, or may include 45 to 55% by weight of the scaly natural graphite and 45 to 55% by weight of the spheroidized natural graphite based on the total weight of the negative electrode active material.

In addition, in the negative electrode active material for a secondary battery according to the present invention, the scaly natural graphite may have an average particle diameter of 12 to 13 μm, and the spheroidized natural graphite may have an average particle diameter of 9 to 11 μm.

In addition, in the negative electrode active material for a secondary battery according to the present invention, the scaly natural graphite may have an average particle diameter equal to or greater than the average particle diameter of the spheroidized natural graphite.

In addition, in the negative electrode active material for a secondary battery according to the present invention, a spheroidization degree of the scaly natural graphite may be 0.4 to 0.6.

In addition, in the negative electrode active material for a secondary battery according to the present invention, a spheroidization degree of the scaly natural graphite may be 0.7 to 0.95.

In addition, in the negative electrode active material for a secondary battery according to the present invention, a tap density of the scaly natural graphite may be 0.9 to 1.2 g/cc.

In addition, in the negative electrode active material for a secondary battery according to the present invention, a tap density of the spheroidized natural graphite may be 1.0 to 1.4 g/cc.

In addition, in the negative electrode active material for a secondary battery according to the present invention, in the scaly natural graphite, the orientation index of the electrode may be 10 to 15 at 28% porosity after rolling.

In addition, in the negative electrode active material for a secondary battery according to the present invention, in the spheroidized natural graphite, the orientation index of the electrode may be 5 to 14 at 28% porosity after rolling.

In addition, the present invention provides a negative electrode for a secondary battery, in which the negative electrode includes a current collector; and a negative electrode mixture layer coated on the current collector, and the negative electrode mixture layer includes a conductive material, a binder, and the negative electrode active material.

In addition, the present invention provides a secondary battery, and

The secondary battery may include a negative electrode, a positive electrode, a separator and an electrolyte interposed between the negative electrode and the positive electrode, and the negative electrode may be a negative electrode including the negative electrode active material.

In addition, the present invention provides a method for manufacturing a negative electrode for a secondary battery.

The method for preparing a negative electrode for a secondary battery may include preparing a negative electrode mixture and applying the negative electrode mixture onto a current collector and drying the same.

The negative electrode active material included in the negative electrode mixture includes a mixture of scaly natural graphite and spheroidized natural graphite.

The negative electrode active material is as described above.

Advantageous Effects

In the negative electrode active material using natural graphite, by using a mixture of natural graphite, which is generated by granulating scaly natural graphite and making them into secondary particles, and spheroidized natural graphite, of which the spheroidization degree and tap density have been increased, it is possible to improve cycle characteristics, swelling characteristics, and rapid charging performance to the level of artificial graphite even if natural graphite is used.

BRIEF DESCRIPTION OF THE DRAWINGS

The FIGURE is a schematic diagram showing the structure of a negative electrode for a secondary battery including a negative electrode active material according to the present invention.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

In the present specification, when a part is "connected" to another part, this includes not only "directly connected" but also "electrically connected" between the parts while having another element therebetween.

In this application, it should be understood that terms such as "include" or "have" are intended to indicate that there is a feature, number, step, operation, component, part, or a combination thereof described on the specification, and they do not exclude in advance the possibility of the presence or addition of one or more other features or numbers, steps, operations, components, parts or combinations thereof. Also, when a portion such as a layer, a film, an area, a plate, etc. is referred to as being "on" another portion, this includes not only the case where the portion is "directly on" the another portion but also the case where further another portion is interposed therebetween. On the other hand, when a portion such as a layer, a film, an area, a plate, etc. is referred to as being "under" another portion, this includes not only the case where the portion is "directly under" the another portion but also the case where further another portion is interposed therebetween. In addition, to be disposed "on" in the present application may include the case disposed at the bottom as well as the top.

As used throughout this specification, the terms "about", "substantially", and the like, are used to mean a value or something like this when unique manufacturing and material tolerances are presented, and the terms are used to prevent unscrupulous infringers from unfair use of the disclosure including accurate or absolute figures in order to aid in the understanding of the present disclosure.

Throughout this specification, the term "combination(s) thereof" included in the expression of the Markush form means one or more mixtures or combinations selected from the group consisting of the elements described in the Markush form representation, and it means to include one or more selected from the group consisting of the above components.

Hereinafter, the present invention will be described in detail.

The negative electrode active material for a secondary battery according to the present invention includes a graphite material as a main component.

Specifically, the negative electrode active material is composed of natural graphite, and more specifically, the natural graphite is a mixture of scaly natural graphite and spheroidized natural graphite.

However, as described above, as the natural graphite charge/discharge cycle is repeated, a swelling phenomenon may occur due to an electrolyte decomposition reaction occurring at the edge portion of the natural graphite, and charge/discharge efficiency and capacity may decrease. In addition, natural graphite has a problem in that there are many internal pores, and when the electrode is rolled, the internal pores are clogged and subject to mechanical stress.

Hence, as described below, by using a mixture of natural graphite, which is generated by granulating scaly natural graphite and making them into secondary particles, and spheroidized natural graphite, of which the spheroidization degree and tap density have been increased, it is possible to improve cycle characteristics, swelling characteristics, and rapid charging performance to the level of artificial graphite even if natural graphite is used.

More specifically, spheroidized graphite has a relatively narrow particle size distribution and less fine powder distribution than scaly graphite. Likewise, as the content of the fine powder decreases, the phase stability of the negative electrode mixture can be maintained, and ultimately, an effect of improving adhesion to the electrode current collector can be obtained.

In particular, when using a negative electrode active material containing spheroidized natural graphite as a negative electrode of a battery, even though there are various advantages as described above, a microcavity may be formed between the spheroidized natural graphites, and when the battery is charged and discharged, as the shrinkage and expansion of the particles are repeated, the conductive path between the particles may become farther away, resulting in deterioration of the cycle characteristics of the battery. The disadvantages due to the microcavity can be compensated by using a conductive material, but there is a limit in creating an electron movement path between negative electrode active materials using only a point or line type conductive material.

Therefore, as the scaly natural graphite is mixed at a certain ratio, the scaly natural graphite is distributed among the spheroidized natural graphite particles, thereby preventing the spheroidized natural graphite particles from being isolated from each other, thereby forming a conductive path between the particles. As such, it is possible to significantly improve the cycle characteristics and life of the battery.

First, the scaly natural graphite contained in the negative electrode active material of the present invention will be described.

The scaly natural graphite is a crystal in which a plurality of hexagonal mesh planes (AB planes) having regular carbon atoms and forming a mesh structure and expanding in a flat shape are stacked, and which have a thickness in the C-axis direction perpendicular to the AB planes.

Since the bonding force (van der Waals force) between the stacked AB surfaces is much smaller than the bonding force (covalent bonding) in the in-plane direction of the AB surfaces, peeling between the AB surfaces is likely to occur. Therefore, since the thickness of the lamination is thin with respect to the enlargement of the AB surface, the overall shape is scaly.

In the negative electrode active material for a secondary battery according to the present invention, the scaly natural graphite may have an average particle diameter ($D_{50}$) of 10 to 15 μm, preferably 12 to 15 μm, and most preferably 12 to 13 μm. In the present invention, the particle diameter of the scaly natural graphite refers to a particle diameter measured based on a long diameter. Herein, the average particle diameter ($D_{50}$) means a particle diameter of 50% cumulative from the smallest particles in the order of particle diameter. By using scaly natural graphite having an average particle diameter within the above range, since the distance to which lithium ions are to be diffused after insertion is relatively small, diffusion resistance of lithium ions is small, lithium ion insertion and desorption is free, and the rapid charging ability at an energy density can be improved.

When the average particle diameter of the scaly natural graphite is less than 10 μm, the initial efficiency of the secondary battery decreases due to an increase in specific surface area, which may degrade battery performance, require a large amount of binders, and cause problems such as filter clogging during the process. Conversely, when the average particle diameter of the scaly natural graphite exceeds 15 μm, electrode adhesion may decrease and cycle characteristics of the battery may decrease, and it may be difficult to uniformly mix the spheroidized natural graphite and the scaly natural graphite. In addition, since the filling density of the active material is lowered, the capacity may be reduced, which is not preferable.

The average particle diameter may be measured using, for example, a laser diffraction method. The laser diffraction method can generally measure a particle diameter of several mm from a submicron region, and can obtain results of high reproducibility and high resolution. More specifically, the particle size of the spheroidized natural graphite may be performed as follows. After dispersing the spheroidized natural graphite in a solution of ethanol/water, it may be introduced into a commercially available laser diffraction particle size measuring device (e.g., Microtrac MT 3000) and irradiated with an output power of 60 W of ultrasonic waves of about 28 kHz, and then the particle size of the spheroidized natural graphite may be calculated based on the particle size distribution in the measuring device.

In addition, the scaly natural graphite may be granulated and be made into secondary particles. The secondary particles refer to large particles that can be physically distinguished and are generated as primary particles are aggregated and combined to have high density, and the primary particles refer to original particles when different kinds of particles are formed from one kind of particles. In addition, granulation means a process in which primary particles are spontaneously or artificially aggregated or agglomerated to form an aggregate composed of a plurality of primary particles to become secondary particles, and can be used interchangeably with the same meaning as terms such as aggregation or combination.

The method of granulating scaly natural graphite or making it into secondary particles is not particularly limited and may be performed by a conventional method in the art. For example, graphite secondary particles, in which the heterogeneous primary particles are aggregated, combined, or granulated by mixing a binder, a catalyst, or the like with primary particles of scaly natural graphite and heat-treating them, may be manufactured. Specifically, the scaly natural graphite particles may be injected into a vacuum reactor under a nitrogen or argon atmosphere, and heat-treated at 1000 to 2800° C. to thereby produce secondary particles. The catalyst may be removed by heat treatment in the above temperature range to form pores in the finally produced graphite secondary particles, and graphite secondary particles having extremely few defects and high crystallinity can be obtained. That is, when heat treatment is performed at a temperature of less than 1000° C., there is a possibility that the graphitization is not normally performed and thus the capacity is not expressed. When the temperature exceeds 2800° C., there is a possibility that the swelling properties are deteriorated. Hence, it may be preferable that the heat treatment is performed at the range of 1000 to 2800° C.

Alternatively, secondary particles of scaly graphite can be obtained by subjecting the primary particles to pressure treatment. In addition, anisotropic pressure treatment is also possible during the pressure treatment, but isotropic pressure treatment is preferred, in which a high tap density can be obtained.

The isotropic pressing treatment method is not particularly limited as long as it is a method that can be isotropically pressurized. Examples include pressurizing treatments such as a hydrostatic isostatic press in which water is used as a pressurizing medium by placing scaly graphite particles serving as raw materials in a rubber container, or an isotropic press by air pressure using gas such as air as a pressurizing medium By using the scaly natural graphite granulated as described above, it is possible to obtain a negative electrode active material having good rolling performance and high density as compared with using the primary particles of the scaly natural graphite.

In addition, in the negative electrode active material according to the present invention, the degree of spheroidization of the scaly natural graphite may be 0.4 to 0.6, and more preferably 0.4 to 0.5. Here, the degree of spheroidization may mean a ratio of a shorter diameter to a long diameter of the particles. The spheroidization degree can be measured through a particle shape analyzer. Specifically, after deriving the cumulative distribution of the spheroidization degree of the scaly natural graphite particles through a particle shape analyzer, the degree of spheroidization, in which the distribution ratio from particles with a large degree of spheroidization corresponds to 50%, can be determined as the degree of spheroidization of the scaly natural graphite.

If the degree of spheroidization is less than 0.4, the surface of scaly natural graphite particles is not uniform, resulting in a problem of low electrode adhesion. In the case that the degree of spheroidization exceeds 0.6, as the spheroidized natural graphite particles shrink and expand repeatedly and accordingly the conductive path between particles of the scaly natural graphite becomes far away, it may become difficult to prevent the spheroidized natural graphite particles from being isolated, resulting in deterioration of the cycle characteristics of the battery.

Further, the tap density of the scaly natural graphite may be 0.9 to 1.2 g/cc, more preferably 0.9 to 1.0 g/cc. The tap density of the active material is the apparent density of the powder obtained by vibrating the container under certain conditions when filling the powder. In the present invention, the tap density was measured by performing tapping 2000 times using TAP-2S, manufactured by LOGAN, a tap density meter.

The higher the tap density, the higher the packing density of the electrode. Specifically, after mixing the active material with a binder or conductive material for electrode production, it is coated on the current collector in a thin film, and is then pressed to harden the electrode. At this time, if the filling is not good, the electrode cannot be made thin, and since it occupies a large volume, it is impossible to realize a high capacity in a given battery volume condition.

When the tap density of the scaly natural graphite is less than 0.90 g/cc, the contact area between the particles may not be sufficient, and thus adhesive properties may be deteriorated, and energy density per unit volume may be reduced. On the other hand, when the tap density of scaly natural graphite exceeds 1.2 g/cc, the tortuosity of the electrode and the wettability of the electrolyte decrease, resulting in a decrease in output characteristics during charging and discharging and causing a reduction in initial efficiency and deterioration of high temperature properties.

Further, in the negative electrode active material according to the present invention, the orientation index of the electrode may be 10 to 15 at a porosity of 28% after rolling of the scaly natural graphite, and more preferably 11 to 14.

The orientation index indicates the degree to which crystal structures inside the negative electrode are arranged in a certain direction. Further, it is possible to check the direction in which the crystals are oriented in the electrode by using the orientation index, and the index may be measured by X-ray diffraction (XRD). More specifically, the orientation index is the area ratio ((004)/(110)) obtained by integrating the peak intensity of plane (110) and plane (004) after measuring the plane (110) and the plane (004) of the negative electrode active material included in the negative electrode by XRD, and more specifically, XRD measurement conditions are as follows.

Target: Cu (Kα ray) graphite monochromator
Slit: divergence slit=1 degree, receiving slit=0.1 mm, scattering slit=1 degree
Measurement area and step angle/measurement time:
Plane (110): 76.5 degrees<2θ<78.5 degrees, 0.01 degrees/3 seconds
Plane (004): 53.5 degrees<2θ<56.0 degrees, 0.01 degrees/3 seconds.
In the above, 2θ represents the diffraction angle.

The XRD measurement is an example, and other measurement methods may also be used.

The orientation index of the negative electrode may depend on the compressive force applied when applying and rolling the negative electrode active material onto the negative electrode current collector. When the orientation index is within the above range, it is possible to obtain a high energy density per unit volume, and show not only stable and high electrode density during rolling, but also excellent electrode adhesion, thereby improving cycle characteristics and swelling phenomenon. When the orientation index is less than 10, the crystallinity of the active material decreases, so it is impossible to achieve the object of improving swelling characteristics and cycle characteristics of the present invention. When the orientation index exceeds 15, since lithium ions are not easily inserted and desorbed, diffusion resistance increases and lithium precipitation occurs during high rate charging and discharging, thereby deteriorating life characteristics. In addition, the orientation index is measured at a porosity of 28% after rolling because the highest energy density can be obtained at a porosity of 28% when an electrode is manufactured by rolling after applying the electrode active material.

Next, the spheroidized natural graphite used in the negative electrode active material according to the present invention will be described.

The spheroidized natural graphite can be obtained by applying a mechanical external force to general natural graphite and performing the granulated spheroidization treatment. For example, the spheroidized natural graphite is treated with an acid or a base for scaly natural graphite, and then spheroidized for 10 minutes to 30 minutes at a rotor speed of 30 m/s to 100 m/s in a spheroidizing device, but not limited thereto.

The average particle diameter ($D_{50}$) of the spheroidized natural graphite may be 14 μm or less, preferably 11 μm or less, and more preferably 9 to 11 μm. When the average particle diameter of graphite exceeds 14 μm, the particle size becomes large and the filling density decreases. Further, as the charge and discharge are repeated, the inter-particle binding property and the binding property between the particle and the current collector decrease, resulting in a significant reduction in cycle and swelling properties.

In addition, in the negative electrode active material, the average particle diameter of the scaly natural graphite may be equal to or greater than the average particle diameter of the spheroidized natural graphite. When the average particle diameter of the spheroidized natural graphite is larger than the average particle diameter of the scaly natural graphite, the spheroidized natural graphite cannot be uniformly filled between the scaly natural graphites, and electrode adhesion and tap density may be reduced.

More specifically, the average particle diameter ($D_{50}$) of the spheroidized natural graphite is 0.5 to 1 times the average particle diameter ($D_{50}$) of the scaly natural graphite, and preferably 0.8 to 1 times. When the ratio of the average particle diameter of artificial graphite and the average particle diameter of spheroidized natural graphite is within the above range, the filling density of the active material in the electrode is improved, and the specific surface area of the active material can be reduced to prevent side reactions with the electrolyte.

The degree of spheroidization of the spheroidized natural graphite may be 0.7 to 0.95, and more preferably 0.8 to 0.9. When the degree of spheroidization is within the above range, the shape of the spheroidized natural graphite becomes close to the sphere, thereby increasing the apparent phase of lithium ions in the electrolyte, and the tap density can be further increased as the shape of the spheroidized natural graphite becomes uniform.

When the spheroidization degree is less than 0.7, the surface of the spheroidized natural graphite particles is not uniform, resulting in a problem of low electrode adhesion. When the spheroidization degree exceeds 0.95, as a large amount of natural graphite is required to derive a high degree of spheroidization degree, the production yield of spheroidized natural graphite may be lowered, which is inefficient.

Further, the tap density of the spheroidized natural graphite may be 1.0 to 1.4 g/cc, more preferably 1.2 to 1.3 g/cc.

The tap density of the spheroidized natural graphite is affected by the particle diameter of the spheroidized natural graphite, and the tap density may decrease as the particle size of the spheroidized natural graphite increases, and the tap density may increase as the particle size of the natural graphite decreases. In general, in order to improve the adhesion between the active material and the electrode current collector, it is preferable to have a large tap density because the adhesion area is increased when the contact area between the particles is increased, thereby improving the adhesion.

When the tap density of the spheroidized natural graphite is less than 1.0 g/cc, the contact area between the particles may not be sufficient, and thus adhesive properties may be deteriorated, and energy density per unit volume may be reduced. On the other hand, when the tap density of the spheroidized natural graphite exceeds 1.4 g/cc, the tortuosity of the electrode and the wettability of the electrolyte decrease, resulting in a decrease in output characteristics during charging and discharging and causing a reduction in initial efficiency and deterioration of high temperature properties.

In addition, as described above, since the average particle diameter of the scaly natural graphite may be equal to or greater than that of the spheroidized natural graphite, and the tap density is affected by the particle size, the tap density of the scaly natural graphite may be equal to or smaller than that of the spheroidized natural graphite.

Next, the spheroidized natural graphite may have an orientation index of 5 to 14 at a porosity of 28% after rolling, and preferably 8 to 11. When the orientation index is within the above range, it is possible to not only exhibit stable and high electrode density during rolling, but also exhibit excellent electrode adhesion, thereby improving cycle characteristics and swelling.

When the orientation index is less than 5, the crystallinity of the active material decreases, so it is impossible to achieve the object of improving swelling characteristics and cycle characteristics of the present invention. When the orientation index exceeds 14, since lithium ions are not easily inserted and desorbed, diffusion resistance increases and lithium precipitation occurs during high rate charging and discharging, thereby deteriorating life characteristics.

In addition, the negative electrode active material according to the present invention may include 40 to 60% by weight of the scaly natural graphite with respect to the total weight of the negative electrode active material, preferably 45 to 55% by weight. Similarly, the negative electrode active material may include 40 to 60% by weight of the spheroidized natural graphite with respect to the total weight of the negative electrode active material, preferably 45 to 55% by weight. More preferably, the weight ratio of the spheroidized natural graphite and scaly natural graphite particles may be 1:1. Within the above range, scaly natural graphite particles and spheroidized natural graphite particles may be uniformly mixed, and the performance of the electrode may be improved.

In the negative electrode active material, when the content of the scaly natural graphite is less than 40% and the content of spheroidized natural graphite exceeds 60%, the content of spheroidized natural graphite may increase too much, which may lead to repetition of the shrinkage and expansion of the spheroidized natural graphite particles at the time of repetition of battery charge/discharge, and deterioration of the cycle characteristics of the battery as the conductive path between the particles becomes far away. Conversely, when the content of the scaly natural graphite is greater than 60% and the content of spheroidized natural graphite is less than 40%, the content of the scaly natural graphite, which is relatively non-uniform in shape, may excessively increase, so that the filling density of the active material may decrease, and accordingly, rate characteristics and output characteristics may deteriorate.

In addition, when one of scaly natural graphite and spheroidized natural graphite is used too much, the pores in the negative electrode active material layer are excessively present due to the morphology of each particle, so filling between the scaly natural graphite and spheroidized natural graphite is not smoothly performed. As a result, the adhesion between the particles in the negative electrode active material and the adhesion between the negative electrode active material and the current collector may become poor. When the amounts of the scaly natural graphite and the spheroidized natural graphite are adjusted in the above range, the pores in the negative electrode active material layer are reduced, and since the scaly natural graphite and the spheroidized natural graphite are smoothly interlocked with each other, electrode adhesion can be improved.

The present invention also provides a negative electrode for a secondary battery containing the negative electrode active material.

The FIGURE is a schematic diagram showing the structure of a negative electrode for a secondary battery including a negative electrode active material according to the present invention.

Referring to the FIGURE, the negative electrode 10 may be prepared by applying a negative electrode mixture containing a negative electrode active material on the current collector 11 and the drying it, and the negative electrode mixture may optionally further include a binder, a conductive material, and a filling material, if necessary. At this time, as the negative electrode active material, a mixture of the aforementioned scaly natural graphite 12 and spheroidized natural graphite 13 may be used.

The sheet for the negative electrode collector generally has a thickness of 3 to 500 micrometers. The negative electrode current collector is not particularly limited as long as it has electrical conductivity without causing chemical changes in the battery, and examples thereof include copper, stainless steel, aluminum, nickel, titanium, sintered carbon, copper or stainless steel of which the surface has been treated with carbon, nickel, titanium, silver or the like, aluminum-cadmium alloy, or the like. In addition, like the positive electrode current collector, fine unevenness can be formed on the surface to enhance the bonding force of the negative electrode active material, and it can be used in various forms such as a film, a sheet, a foil, a net, a porous body, a foam, and a nonwoven fabric.

The conductive material is usually added in an amount of 1 to 30% by weight based on the total weight of the mixture including the negative electrode active material. Such a conductive material is not particularly limited as long as it has electrical conductivity without causing a chemical change in the battery, and examples thereof include graphite such as natural graphite and artificial graphite; carbon black such as carbon black, acetylene black, Ketjen black, channel black, furnace black, lamp black, and thermal black; conductive fibers such as carbon fiber and metal fiber; metal powders such as carbon fluoride, aluminum and nickel powder; conductive whiskey such as zinc oxide and potassium titanate; conductive metal oxides such as titanium oxide; and conductive materials such as polyphenylene derivatives and the like.

The binder is added in an amount of 1 to 30% by weight, on the basis of the total weight of the mixture containing the negative electrode active material, as a component that assists in bonding between the active material and the conductive material and bonding to the current collector. Examples of such binders include polyvinylidene fluoride, polyvinyl alcohol, carboxymethylcellulose (CMC), starch, hydroxypropylcellulose, regenerated cellulose, polyvinylpyrrolidone, tetrafluoroethylene, polyethylene, polypropylene, ethylene-propylene-diene terpolymer (EPDM), sulfonated EPDM, styrene butylene rubber, fluorine rubber, various copolymers and the like.

The filler is optionally used as a component for inhibiting expansion of an electrode, and is not particularly limited as long as it is a fibrous material without causing a chemical change in the battery. Examples of the filler include olefin polymers such as polyethylene and polypropylene; fibrous materials such as glass fibers and carbon fibers.

Other components, such as viscosity modifiers, adhesion promoters, and the like may be further included optionally or in combination of two or more. The viscosity modifier is a component that adjusts the viscosity of the electrode mixture so that the mixing process of the electrode mixture and the coating process on the current collector thereof may be easy, and may be added up to 30% by weight based on the total weight of the negative electrode mixture. Examples of such a viscosity modifier include carboxy methyl cellulose, polyvinylidene fluoride, and the like, but are not limited thereto. In some cases, the solvent described above may serve as a viscosity modifier.

The adhesion promoter is an auxiliary component added to improve the adhesion of the active material to the current collector and may be added in less than 10% by weight compared to the binder, and some examples thereof include oxalic acid, adipic acid, formic acid, acrylic acid derivatives, itaconic acid derivatives, and the like.

The present invention also provides a secondary battery produced by the method. Specifically, the secondary battery includes at least two secondary battery electrodes manufactured by the present invention and has a structure in which the electrode assembly is embedded in the battery case, wherein the electrode assembly is wound with a separator interposed between the secondary battery electrodes and has a structure in which the electrode assembly is impregnated with a lithium salt-containing non-aqueous electrolyte. The electrode for the secondary battery may be a positive electrode and/or a negative electrode. At this time, the negative electrode described above may be used, and the negative electrode may be manufactured as a lithium secondary battery after being assembled as an electrode assembly and sealed in a battery case together with an electrolyte, followed by an activation process. The secondary battery may be a cylindrical battery, a prismatic battery, a pouch-type battery, or a coin-type battery, and the shape and structure of the battery is not particularly limited.

The electrode assembly is not particularly limited as long as it has a structure made of a positive electrode and a negative electrode and a separator interposed therebetween, for example, a folding structure, or a stacked structure, or a stack/folding type (SNF) structure, or lamination/stack-type (LNS) structure.

The folding-type electrode assembly includes at least one positive electrode, at least one negative electrode, and at least one separator interposed between the positive electrode and the negative electrode and the positive electrode, the separator, and the negative electrode may have a structure in which one end and the other end do not cross each other.

Further, the stack-type electrode assembly includes at least one positive electrode, at least one negative electrode, and at least one separator interposed between the positive electrode and the negative electrode and the positive electrode, the separator, and the negative electrode may have a structure in which one end and the other end cross each other.

The stack/folding-type electrode assembly includes at least one positive electrode, at least one negative electrode, and at least one separator interposed between the positive electrode and the negative electrode, and the separator includes a first separator and a second separator. Further, the positive electrode, the first separator, and the negative electrode may have a structure in which one end and the other end do not cross each other. The second separator may have a structure surrounding an electrode side on which an electrode tab is not formed.

The electrode assembly of the lamination-stack structure may include one or more improved electrodes having a laminate laminated on one or both surfaces thereof. The improved electrode, for example, may be implemented in a structure in which the separator is bonded to one surface of the positive electrode or the negative electrode. In addition, the separator may be implemented in a structure that is bonded to both sides of the positive electrode or both sides of the negative electrode. In addition, the positive electrode, the separator and the negative electrode may be implemented in a structure that is bonded to each other in a state where the separator is interposed between the positive electrode and the negative electrode.

In the secondary battery according to the present invention, the positive electrode may be prepared by applying an electrode mixture containing a positive electrode active material on a current collector and drying it, and the positive electrode mixture may optionally further include a binder, a conductive material, a filler, and the like, if necessary.

In the present invention, the positive electrode collector generally has a thickness of 3 to 500 micrometers. The positive electrode current collector is not particularly limited as long as it has high conductivity without causing a chemical change in the battery. Examples of the positive electrode current collector include stainless steel, aluminum, nickel, titanium, sintered carbon or aluminum or stainless steel of which the surface has been treated with carbon, nickel, titanium, silver, or the like. The current collector may have fine irregularities on the surface thereof to increase the adhesion of the positive electrode active material, and various forms such as a film, a sheet, a foil, a net, a porous body, a foam, and a nonwoven fabric are possible.

In the present invention, the positive electrode active material is a material capable of causing an electrochemical reaction and a lithium transition metal oxide, and contains two or more transition metals. Examples thereof include: layered compounds such as lithium cobalt oxide ($LiCoO_2$) and lithium nickel oxide ($LiNiO_2$) substituted with one or more transition metals; lithium manganese oxide substituted with one or more transition metals; lithium nickel oxide represented by the formula $LiNi_{1-y}M_yO_2$ (wherein M=Co, Mn, Al, Cu, Fe, Mg, B, Cr, Zn or Ga and contains at least one of the above elements, $0.01 \leq y \leq 0.7$); lithium nickel cobalt manganese composite oxide represented by the formula $Li_{1+z}Ni_bMn_cCo_{1-(b+c+d)}M_dO_{(2-e)}A_e$ such as $Li_{1+z}Ni_{1/3}Co_{1/3}Mn_{1/3}O_2$, $Li_{1+z}Ni_{0.4}Mn_{0.4}Co_{0.2}O_2$ etc. (wherein $-0.5 \leq z \leq 0.5$, $0.1 \leq b \leq 0.8$, $0.1 \leq c \leq 0.8$, $0 \leq d \leq 0.2$, $0 \leq e \leq 0.2$, b+c+d<1, M=Al, Mg, Cr, Ti, Si or Y, and A=F, P or Cl); olivine-based lithium metal phosphate represented by the formula $Li_{1+x}M_{1-y}M'_yPO_{4-z}X_z$ (wherein M=transition metal, preferably Fe, Mn, Co or Ni, M'=Al, Mg or Ti, X=F, S or N, and $-0.5 \leq x \leq 0.5$, $0 \leq y \leq 0.5$, $0 \leq z \leq 0.1$).

In the positive electrode, additive materials such as a binder, a conductive material, and a filling material are as described above.

The separator is interposed between the positive electrode and the negative electrode, and an insulating thin film having high ion permeability and mechanical strength is used. The pore diameter of the separator is generally 0.01 to 10 micrometers, and the thickness is generally 5 to 300 micrometers. Examples of such a separator include olefin-based polymers such as polypropylene which is chemically resistant and hydrophobic; a sheet or a nonwoven fabric made of glass fiber, polyethylene or the like. When a solid electrolyte such as a polymer is used as the electrolyte, the solid electrolyte may also serve as a separator.

The lithium salt-containing non-aqueous electrolyte solution consists of an electrolyte and a lithium salt. And a non-aqueous organic solvent, an organic solid electrolyte, an inorganic solid electrolyte, and the like are used as the electrolyte solution.

Examples of the non-aqueous organic solvent include N-methyl-2-pyrrolidinone, propylene carbonate, ethylene carbonate, butylenecarbonate, dimethyl carbonate, diethyl carbonate, gamma-Butyrolactone, 1,2-dimethoxyethane, tetrahydroxyfuran, 2-methyltetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxymethane, dioxolane derivatives, sulfolane, methyl sulfolane, 1,3-dimethyl-2-imidazolidinone, propylene carbonate derivatives, tetrahydrofuran derivatives, ethers, methyl pyrophosphate, ethyl propionate, etc.

Examples of the organic solid electrolyte include a polymer electrolyte such as a polyethylene derivative, a polyethylene oxide derivative, a polypropylene oxide derivative, a phosphate ester polymer, a polyagitation lysine, a polyester sulfide, a polyvinyl alcohol, a polyvinylidene fluoride, a polymerizer including an ionic dissociation group, and the like.

Examples of the inorganic solid electrolyte include nitrides, halides, and sulfates of Li such as $Li_3N$, Li, $Li_5NI_2$, $Li_3N$—LiI-LOH, $LSiO_4$, $LSiO_4$—LiI-LOH, $Li_2SiS_3$, $Li_4SiO_4$, $Li_4SiO_4$—LiI—LiOH, and $Li_3PO_4$—$Li_2S$—$SiS_2$.

The lithium salt is a substance that is soluble in the non-aqueous electrolyte. The examples of the lithium salt include LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroborane lithium, lower aliphatic carboxylic acid lithium, lithium 4-phenylborate, lithium imide and the like.

For the purpose of improving charge/discharge characteristics, flame retardancy, etc., pyridine, triethylphosphite, triethanolamine, cyclic ether, ethylenediamine, n-glyme, hexaphosphoric triamide, nitrobenzene derivative, sulfur, quinone imine dye, N-substituted oxazolidinone, N,N-substituted imidazolidine, ethylene glycol dialkyl ether, ammonium salt, pyrrole, 2-methoxyethanol, aluminum trichloride, etc. may be added to the electrolyte. In some cases, a halogen-containing solvent such as carbon tetrachloride or ethylene trifluoride may be further added to impart nonflammability, or a carbon dioxide gas may be further added to improve the high-temperature storage characteristics, and FEC (Fluoro-EthyleneCarbonate), PRS (Propene sultone), and the like may be further added.

In one preferred example, a lithium salt such as $LiPF_6$, $LiClO_4$, $LiBF_4$, and $LiN(SO_2CF_3)_2$ may be added to a mixed solvent of a cyclic carbonate of EC or PC which is a high-dielectric solvent and a linear carbonate of DEC, DMC or EMC which is low viscosity solvent to thereby prepare a non-aqueous electrolyte containing a lithium salt.

In addition, the present invention provides a method for manufacturing a negative electrode including the negative electrode active material.

The method for preparing the negative electrode includes preparing a negative electrode mixture and applying the negative electrode mixture on a current collector and then drying it.

In addition, the negative electrode active material included in the negative electrode mixture includes a mixture of scaly natural graphite and spheroidized natural graphite.

Specifically, the negative electrode active material described above may be used.

More specifically, in the method of manufacturing the negative electrode, preparing the negative electrode mixture may include spheroidizing natural graphite; preparing scaly natural graphite; and mixing the spheroidized natural graphite and scaly natural graphite.

The step of spheroidizing the natural graphite is a step of spheroidizing by applying a mechanical external force to general scaly natural graphite. As described above, it can be obtained by treating scaly natural graphite with an acid or a base and then spheroidizing at a rotor speed of 30 m/s to 100 m/s in a spheroidizing device for 10 to 30 minutes.

In addition, spheroidizing the natural graphite and preparing scaly natural graphite may further include classifying the spheroidized natural graphite and scaly natural graphite particles so that the particle size distribution becomes uniform.

Through the classifying step, the average particle diameter ($D_{50}$) of the spheroidized natural graphite and scaly natural graphite may be adjusted according to the above-described numerical values.

The classification process may be carried out by any method, but it is appropriate to perform it by an air flow classification process. In the case of performing the air flow classification process, the conditions of the air flow classification process can be appropriately adjusted according to the type of the active material.

When spheroidized natural graphite and scaly natural graphite are prepared, the spheroidized natural graphite and scaly natural graphite are mixed, and the mixing method is not particularly limited. For example, one having a high-speed chopper such as a Henschel mixer or a Spartan Luther, or a Nauter mixer or a ribbon mixer can be used for uniform mixing at high speed.

The spheroidized natural graphite and scaly natural graphite are mixed, a binder and a conductive material are added, and a solvent such as water is added thereto to prepare a negative electrode mixture slurry. If necessary, a thickener such as carboxymethylcellulose (CMC) may be further included.

Hereinafter, the present invention will be described in detail with reference to examples. However, the embodiments according to the present invention may be modified into various other forms, and the scope of the present invention should not be construed as being limited to the examples described below. The examples of the present invention are provided to more fully describe the present invention to those skilled in the art.

Example 1

Preparation of Negative Electrode

A negative electrode was prepared using a negative electrode active material containing 50% by weight of scaly natural graphite and 50% by weight of spheroidized natural graphite. Specifically, scaly natural graphite, which has been granulated and made into secondary particles and has a small particle size, and natural graphite, which has a small particle size and has high spheroidization degree and tap density, were used as the negative electrode active material.

The scaly natural graphite had an average particle diameter ($D_{50}$) of 12 μm, a spheroidization degree of 0.5, a tap density of 1.0 g/cc, and an electrode orientation index of 11 at a porosity of 28% after electrode rolling. The spheroidized natural graphite had an average particle diameter ($D_{50}$) of 10 μm, a spheroidization degree of 0.9, a tap density of 1.3 g/cc, and an electrode orientation index of 8 at a porosity of 28% after electrode rolling.

The natural graphite used as a negative electrode active material, SuperC65 used as a conductive material, styrene butadiene rubber (SBR) used as a binder, and carboxymethylcellulose (CMC) used as a thickener were mixed at a weight ratio of 96.6:1:1.3:1.1, respectively, and water was added to prepare a slurry.

The slurry prepared as described above was applied to a copper foil, and a negative electrode having an area of 1.4875 $cm^2$ in vacuum drying at about 130° C. for 10 hours was prepared. At this time, the loading of the negative electrode was prepared to be 3.61 $mAh/cm^2$.

Preparation of Battery Cells

The negative electrode active material was coated on a copper foil to prepare a negative electrode so that the loading amount was 3.61 $mAh/cm^2$ in an area of 1.7671 $cm^2$. Further, a positive electrode mixture containing $LiCoO_2$ (LCO) as a positive electrode active material was applied to the aluminum foil to prepare a 1.4875 $cm^2$ counter electrode. An electrode assembly was manufactured by interposing a polyethylene separator between the working electrode and the counter electrode. Then, 1M $LiPF_6$ was added to a solvent in which 0.5 wt % of the non-aqueous electrolyte additive VC, which was generated by mixing ethylene carbonate (EC) with diethylene carbonate (DEC) in a volume ratio of 1:4, to thereby prepare a non-aqueous electrolyte solution, which was then injected into the electrode assembly. The electrode assembly was put in a case to produce a coin-type full-cell secondary battery.

In addition, the negative electrode active material was coated on a copper foil to prepare a working electrode (negative electrode) so that the loading amount was 3.61 $mAh/cm^2$ in an area of 1.4875 $cm^2$, and lithium metal having an area of 1.7671 $cm^2$ was used as a counter electrode (positive electrode). An electrode assembly was manufactured by interposing a polyethylene separator between the working electrode and the counter electrode. Then, 1M $LiPF_6$ was added to a solvent in which 0.5 wt % of the non-aqueous electrolyte additive VC, which was generated by mixing ethylene carbonate (EC) with diethylene carbonate (DEC) in a volume ratio of 1:4, to thereby prepare a non-aqueous electrolyte solution, which was then injected into the electrode assembly. The electrode assembly was put in a case to produce a coin-type half-cell secondary battery.

Example 2

Preparation of Negative Electrode

A negative electrode was prepared using a negative electrode active material containing 50% by weight of scaly natural graphite and 50% by weight of spheroidized natural graphite. Specifically, scaly natural graphite, which has been granulated and made into secondary particles and has a small particle size, and natural graphite, which has a small particle size and has high spheroidization degree and tap density, were used as the negative electrode active material.

The scaly natural graphite had an average particle diameter ($D_{50}$) of 13 μm, a spheroidization degree of 0.4, a tap density of 0.9 g/cc, and an electrode orientation index of 14 at a porosity of 28% after electrode rolling. The spheroidized natural graphite had an average particle diameter ($D_{50}$) of 11 μm, a spheroidization degree of 0.8, a tap density of 1.2 g/cc, and an electrode orientation index of 11 at a porosity of 28% after electrode rolling.

The natural graphite used as a negative electrode active material, SuperC65 used as a conductive material, styrene butadiene rubber (SBR) used as a binder, and carboxymethylcellulose (CMC) used as a thickener were mixed at a weight ratio of 96.6:1:1.3:1.1, respectively, and water was added to prepare a slurry.

The slurry prepared as described above was applied to a copper foil, and a negative electrode having an area of 1.4875 cm$^2$ in vacuum drying at about 130° C. for 10 hours was prepared. At this time, the loading of the negative electrode was prepared to be 3.61 mAh/cm$^2$ Preparation of Battery Cells The negative electrode active material of Example 2 was used to prepare a battery (coin type full cell and half-cell battery) in the same manner as in Example 1.

Example 3

A negative electrode and a battery (coin type full cell and half-cell battery) were prepared in the same manner as in Example 1 except that the negative electrode active material containing 60% by weight of the scaly natural graphite of Example 1 and 40% by weight of the spheroidized natural graphite of Example 1 was used.

Example 4

A negative electrode and a battery (coin type full cell and half-cell battery) were prepared in the same manner as in Example 1 except that the negative electrode active material containing 40% by weight of the scaly natural graphite of Example 1 and 60% by weight of the spheroidized natural graphite of Example 1 was used.

Example 5

In the negative electrode active material, a negative electrode and a battery (coin type full cell and half-cell battery) were prepared in the same manner as in Example 1, except that the average particle diameter of the scaly natural graphite was 14 μm.

Example 6

In the negative electrode active material, a negative electrode and a battery (coin type full cell and half-cell battery) were prepared in the same manner as in Example 1, except that the average particle diameter of the scaly natural graphite was 15 μm.

Example 7

In the negative electrode active material, a negative electrode and a battery (coin type full cell and half-cell battery) were prepared in the same manner as in Example 1, except that the spheroidization degree of spheroidized natural graphite was 0.7 and the tap density was 1.10 g/cc.

Comparative Example 1

A negative electrode and a battery (coin type full cell and half-cell battery) were prepared in the same manner as in Example 1 except that the negative electrode active material containing 75% by weight of the scaly natural graphite of Example 1 and 25% by weight of the spheroidized natural graphite of Example 1 was used.

Comparative Example 2

A negative electrode and a battery (coin type full cell and half-cell battery) were prepared in the same manner as in Example 1 except that the negative electrode active material containing 65% by weight of the scaly natural graphite of Example 1 and 35% by weight of the spheroidized natural graphite of Example 1 was used.

Comparative Example 3

A negative electrode and a battery (coin type full cell and half-cell battery) were prepared in the same manner as in Example 1 except that the negative electrode active material containing 35% by weight of the scaly natural graphite of Example 1 and 65% by weight of the spheroidized natural graphite of Example 1 was used.

Comparative Example 4

A negative electrode and a battery (coin type full cell and half-cell battery) were prepared in the same manner as in Example 1 except that the negative electrode active material containing 25% by weight of the scaly natural graphite of Example 1 and 75% by weight of the spheroidized natural graphite of Example 1 was used.

Comparative Example 5

A negative electrode was prepared using a negative electrode active material containing 50% by weight of scaly natural graphite and 50% by weight of spheroidized natural graphite. Specifically, scaly natural graphite, which has been granulated and made into secondary particles and has a large particle size, and natural graphite, which has a small particle size and has high spheroidization degree and tap density, were used as the negative electrode active material.

The scaly natural graphite had an average particle diameter ($D_{50}$) of 16 μm, a spheroidization degree of 0.3, a tap density of 0.9 g/cc, and an electrode orientation index of 18 at a porosity of 28% after electrode rolling. The spheroidized natural graphite had an average particle diameter ($D_{50}$) of 10 μm, a spheroidization degree of 0.9, a tap density of 1.3 g/cc, and an electrode orientation index of 8 at a porosity of 28% after electrode rolling.

A battery was manufactured in the same manner as in Example 1, except that a negative electrode and a coin-type full cell and a coin-type half-cell including the negative electrode were manufactured using the negative electrode active material.

Comparative Example 6

A negative electrode was prepared using a negative electrode active material containing 50% by weight of scaly natural graphite and 50% by weight of spheroidized natural graphite. Specifically, scaly natural graphite, which has been granulated and made into secondary particles and has a small particle size, and natural graphite, which has a large particle size and has high spheroidization degree and tap density, were used as the negative electrode active material.

The scaly natural graphite had an average particle diameter ($D_{50}$) of 12 μm, a spheroidization degree of 0.5, a tap density of 1.0 g/cc, and an electrode orientation index of 11 at a porosity of 28% after electrode rolling. The spheroidized natural graphite had an average particle diameter ($D_{50}$) of 17 μm, a spheroidization degree of 0.8, a tap density of 1.2 g/cc, and an electrode orientation index of 18 at a porosity of 28% after electrode rolling.

A battery was manufactured in the same manner as in Example 1, except that a negative electrode and a coin-type full cell and a coin-type half-cell including the negative electrode were manufactured using the negative electrode active material.

Comparative Example 7

A negative electrode was prepared using a negative electrode active material containing 50% by weight of scaly natural graphite and 50% by weight of spheroidized natural graphite. Specifically, scaly natural graphite, which has been granulated and made into secondary particles and has a small particle size, and natural graphite, which has a large particle size and has low spheroidization degree and tap density, were used as the negative electrode active material.

The scaly natural graphite had an average particle diameter ($D_{50}$) of 12 μm, a spheroidization degree of 0.5, a tap density of 1.0 g/cc, and an electrode orientation index of 11 at a porosity of 28% after electrode rolling. The spheroidized natural graphite had an average particle diameter ($D_{50}$) of 17 μm, a spheroidization degree of 0.3, a tap density of 0.8 g/cc, and an electrode orientation index of 28 at a porosity of 28% after electrode rolling.

A battery was manufactured in the same manner as in Example 1, except that a negative electrode and a coin-type full cell and a coin-type half-cell including the negative electrode were manufactured using the negative electrode active material.

Comparative Example 8

A negative electrode was prepared using a negative electrode active material containing 50% by weight of spheroidized natural graphite and 50% by weight of another spheroidized natural graphite. Specifically, spheroidized natural graphite having a low spheroidization degree and tap density and having a large particle diameter and another spheroidized natural graphite having a low spheroidization degree and tap density and a large particle diameter were used as the negative electrode active material.

The spheroidized natural graphite had an average particle diameter ($D_{50}$) of 21 μm, a spheroidization degree of 0.5, a tap density of 0.8 g/cc, and an electrode orientation index of 35 at a porosity of 28% after electrode rolling. The another spheroidized natural graphite had an average particle diameter ($D_{50}$) of 17 μm, a spheroidization degree of 0.3, a tap density of 0.8 g/cc, and an electrode orientation index of 28 at a porosity of 28% after electrode rolling.

A battery was manufactured in the same manner as in Example 1, except that a negative electrode and a coin-type full cell and a coin-type half-cell including the negative electrode were manufactured using the negative electrode active material. Table 1 below shows the content ratios of the scaly natural graphite and spheroidized natural graphite used in Examples and Comparative Examples, and Table 2 shows the physical properties of each natural graphite.

TABLE 1

| Division | Scaly natural graphite (w %) | Spheroidized natural graphite (w %) |
|---|---|---|
| Example 1 | 50 | 50 |
| Example 2 | 50 | 50 |
| Example 3 | 60 | 40 |
| Example 4 | 40 | 60 |
| Example 5 | 50 | 50 |
| Example 6 | 50 | 50 |
| Example 7 | 50 | 50 |
| Comparative Example 1 | 75 | 25 |
| Comparative Example 2 | 65 | 35 |
| Comparative Example 3 | 35 | 65 |
| Comparative Example 4 | 25 | 75 |
| Comparative Example 5 | 50 | 50 |
| Comparative Example 6 | 50 | 50 |
| Comparative Example 7 | 50 | 50 |
| Comparative Example 8 | 50 | 50 |

(Comparative example 8 is not a mixture of scaly natural graphite and spheroidized natural graphite, but is a mixture of two spheroidized natural graphites with different physical properties)

TABLE 2

| | Properties of scaly natural graphite | | | | Properties of spheroidized natural graphite | | | |
|---|---|---|---|---|---|---|---|---|
| Division | $D_{50}$ (μm) | Spheroidization degree | Tap density (g/cc) | OI | $D_{50}$ (μm) | Spheroidization degree | Tap density (g/cc) | OI |
| Example 1 | 12 | 0.5 | 1 | 11 | 10 | 0.9 | 1.3 | 8 |
| Example 2 | 13 | 0.4 | 0.9 | 14 | 11 | 0.8 | 1.2 | 11 |
| Example 3 | 12 | 0.5 | 1 | 11 | 10 | 0.9 | 1.3 | 8 |
| Example 4 | 12 | 0.5 | 1 | 11 | 10 | 0.9 | 1.3 | 8 |
| Example 5 | 14 | 0.5 | 1 | 11 | 10 | 0.9 | 1.3 | 8 |
| Example 6 | 15 | 0.5 | 1 | 11 | 10 | 0.9 | 1.3 | 8 |
| Example 7 | 12 | 0.5 | 1 | 11 | 10 | 0.7 | 1.1 | 8 |
| Comparative Example 1 | 12 | 0.5 | 1 | 11 | 10 | 0.9 | 1.3 | 8 |
| Comparative Example 2 | 12 | 0.5 | 1 | 11 | 10 | 0.9 | 1.3 | 8 |
| Comparative Example 3 | 12 | 0.5 | 1 | 11 | 10 | 0.9 | 1.3 | 8 |

TABLE 2-continued

| | Properties of scaly natural graphite | | | | Properties of spheroidized natural graphite | | | |
|---|---|---|---|---|---|---|---|---|
| Division | $D_{50}$ (μm) | Spheroidization degree | Tap density (g/cc) | OI | $D_{50}$ (μm) | Spheroidization degree | Tap density (g/cc) | OI |
| Comparative Example 4 | 12 | 0.5 | 1 | 11 | 10 | 0.9 | 1.3 | 8 |
| Comparative Example 5 | 16 | 0.3 | 0.9 | 18 | 10 | 0.9 | 1.3 | 8 |
| Comparative Example 6 | 12 | 0.5 | 1 | 11 | 17 | 0.8 | 1.2 | 18 |
| Comparative Example 7 | 12 | 0.5 | 1 | 11 | 17 | 0.3 | 0.8 | 28 |
| Comparative Example 8 | 21 | 0.5 | 0.8 | 35 | 17 | 0.3 | 0.8 | 28 |

(Comparative example 8 is not a mixture of scaly natural graphite and spheroidized natural graphite, but is a mixture of two spheroidized natural graphites with different physical properties)

Experimental Example 1

In-Situ SAC Swelling Test

The charging range was determined to allow SOC to become from 0 to 95% by using the manufactured coin-type full cell, and the change in the thickness of the negative electrode during charging and discharging was expressed as a swelling ratio (%) while charging the first cycle at 0.1 C, the second cycle at 0.2 C, and the third to 30th cycles at 0.5 C. The results are shown in Table 3.

Experimental Example 2

Li-Plating Test

The half-cell was charged and discharged at 1 C for 3 cycles by using the prepared coin-type half-cell, and then charged at 3 C for 15 minutes to first differentiate the profile. At this time, the inflection point appearing in dQ/dV was checked to quantify lithium plating SOC (Li-Plating SOC, %), which is the SOC at the time of lithium precipitation on the negative electrode surface. The results are shown in Table 3.

Experimental Example 3

Peel Strength (Adhesion) Test of Negative Electrode

The negative electrode was rolled to 28% porosity to perform Peel Strength Test. At this time, by using the slide glass, the electrodes were directed at a 90-degree right angle direction, and the current collector was peeled off to measure electrode adhesion (peeling strength), and the results are shown in Table 3 below.

TABLE 3

| Division | Swelling Ratio (%) | Li-Plating SOC (%) | Electrode adhesion (gf) |
|---|---|---|---|
| Example 1 | 21.3 | 46 | 37 |
| Example 2 | 22.2 | 44 | 35 |
| Example 3 | 21.7 | 43 | 34 |
| Example 4 | 22.1 | 45 | 36 |
| Example 5 | 23.5 | 43 | 35 |
| Example 6 | 23.2 | 42 | 32 |
| Example 7 | 23.8 | 44 | 35 |
| Comparative Example 1 | 28.5 | 35 | 26 |
| Comparative Example 2 | 28.1 | 36 | 24 |
| Comparative Example 3 | 29.5 | 34 | 27 |
| Comparative Example 4 | 29.7 | 32 | 24 |
| Comparative Example 5 | 29.5 | 30 | 26 |
| Comparative Example 6 | 29.8 | 33 | 23 |
| Comparative Example 7 | 32.6 | 27 | 21 |
| Comparative Example 8 | 34.7 | 22 | 24 |

As can be seen in Table 1, in Examples 1 and 2 using the negative electrode active material according to the present invention, scaly natural graphite having been made into secondary particles and spheroidized natural graphite having a high degree of spheroidization and tap density have been used. It is seen that the swelling characteristics and the cycle characteristics have been improved in Examples 1 and 2, compared to Comparative Example 5 using a scaly natural graphite having a large particle size, Comparative Example 6 using a spheroidized natural graphite having a large particle size, and Comparative Example 7 using a natural graphite having a low degree of spheroidization and low tap density. Similarly, it is seen that the swelling properties and cycle characteristics have been improved in Example 1 and Example 2 compared to Comparative Example 8 using spheroidized natural graphite with poor spheroidization degree and tap density.

In addition, with respect to the content ratio of scaly natural graphite and spheroidized natural graphite, it can be seen that the swelling characteristics and cycle characteristics have been improved in Examples 1 to 4, in which the content ratio of scaly natural graphite and spheroidized natural graphite is within the above range, compared with Comparative Examples 1 to 4.

Finally, it can be seen that swelling characteristics and cycle characteristics have been improved in Example 1 and Examples 5 to 7, in which the particle size of the spheroidized natural graphite are within the scope of the present invention, compared to Comparative Example 6.

The above description is merely illustrative of the technical idea of the present invention, and those skilled in the art to which the present invention pertains may make various modifications and variations without departing from the essential characteristics of the present invention. Therefore, the embodiments disclosed in the present invention are not intended to limit the technical spirit of the present invention, but to explain the protection scope of the present invention and should be interpreted by the claims below, and it should be interpreted that all technical spirits within the equivalent scope are included in the scope of the present invention.

DESCRIPTION OF REFERENCE NUMERALS

10: negative electrode
11: current collector
12: scaly natural graphite
13: spheroidized natural graphite

The invention claimed is:

1. A negative electrode active material for a secondary battery, comprising:
   a mixture of scaly natural graphite and spheroidized natural graphite, and
   wherein the negative electrode active material comprises 40 to 60% by weight of the scaly natural graphite and 40 to 60% by weight of the spheroidized natural graphite based on a total weight of the negative electrode active material,
   wherein the scaly natural graphite has an average particle diameter ($D_{50}$) of 12 μm to 15 μm,
   wherein the spheroidized natural graphite has an average particle diameter ($D_{50}$) of 9 μm to 11 μm,
   wherein a spheroidization degree of the scaly natural graphite is 0.4 to 0.6,
   wherein a spheroidization degree of the spheroidized natural graphite is 0.8 to 0.95, and
   wherein a tap density of the spheroidized natural graphite is 1.2 g/cc to 1.3 g/cc.

2. The negative electrode active material of claim 1, wherein the scaly natural graphite is granulated and is agglomerated into secondary particles.

3. The negative electrode active material of claim 1, wherein the negative electrode active material comprises 45 to 55% by weight of the scaly natural graphite and 45 to 55% by weight of the spheroidized natural graphite based on a total weight of the negative electrode active material.

4. The negative electrode active material of claim 1, wherein the scaly natural graphite has an average particle diameter equal to or greater than the average particle diameter of the spheroidized natural graphite.

5. The negative electrode active material of claim 1, wherein a tap density of the scaly natural graphite is 0.9 g/cc to 1.2 g/cc.

6. The negative electrode active material of claim 1, wherein, in the scaly natural graphite, the orientation index of the electrode is 10 to 15 at 28% porosity after rolling.

7. The negative electrode active material of claim 1, wherein, in the spheroidized natural graphite, the orientation index of the electrode is 5 to 14 at 28% porosity after rolling.

8. A negative electrode for a secondary battery, the negative electrode comprising:
   a current collector; and
   a negative electrode mixture layer coated on the current collector,
   wherein the negative electrode mixture layer comprises a conductive material, a binder, and the negative electrode active material according to claim 1.

9. A secondary battery comprising:
   a negative electrode;
   a positive electrode;
   a separator interposed between the negative electrode and the positive electrode; and
   an electrolyte,
   wherein the negative electrode is the negative electrode of claim 8.

10. The negative electrode active material of claim 1, wherein the spheroidization degree of the spheroidized natural graphite is 0.9 to 0.95.

11. The negative electrode active material of claim 1, wherein a weight ratio of the spheroidized natural graphite to the scaly natural graphite particles is 1:1.

* * * * *